(12) United States Patent
Raffill et al.

(10) Patent No.: US 7,792,846 B1
(45) Date of Patent: Sep. 7, 2010

(54) TRAINING PROCEDURE FOR N-GRAM-BASED STATISTICAL CONTENT CLASSIFICATION

(75) Inventors: Thomas E. Raffill, Sunnyvale, CA (US);
Shunhui Zhu, San Jose, CA (US);
Roman Yanovsky, Los Altos, CA (US);
Boris Yanovsky, Saratoga, CA (US);
John Gmuender, San Jose, CA (US)

(73) Assignee: SonicWall, Inc., San Jose, CA (US)

( * ) Notice: Subject to any disclaimer, the term of this patent is extended or adjusted under 35 U.S.C. 154(b) by 368 days.

(21) Appl. No.: 11/881,770

(22) Filed: Jul. 27, 2007

(51) Int. Cl.
*G06F 7/00* (2006.01)
*G06F 17/30* (2006.01)

(52) U.S. Cl. ............................ 707/754; 707/758

(58) Field of Classification Search ............... 707/1–10, 707/100–104.1, 200–206, 600–831; 704/1, 704/9, 10, 251, 257, 240; 379/88.09
See application file for complete search history.

(56) References Cited

U.S. PATENT DOCUMENTS

| | | | |
|---|---|---|---|
| 5,678,041 A | 10/1997 | Baker et al. | |
| 6,003,030 A | 12/1999 | Kenner et al. | |
| 6,061,692 A | 5/2000 | Thomas et al. | |
| 6,092,038 A * | 7/2000 | Kanevsky et al. | 704/9 |
| 6,272,456 B1 * | 8/2001 | de Campos | 704/8 |
| 6,502,125 B1 | 12/2002 | Kenner et al. | |
| 6,691,156 B1 | 2/2004 | Drummond et al. | |
| 6,772,214 B1 | 8/2004 | McClain et al. | |
| 6,981,029 B1 | 12/2005 | Menditto et al. | |
| 7,089,246 B1 | 8/2006 | O'Laughlen | |
| 7,194,464 B2 | 3/2007 | Kester et al. | |
| 2003/0225763 A1 | 12/2003 | Guilak et al. | |
| 2005/0086252 A1 | 4/2005 | Jones et al. | |
| 2005/0273450 A1 | 12/2005 | McMillen et al. | |

FOREIGN PATENT DOCUMENTS

WO   WO0155873 A1   1/2000

OTHER PUBLICATIONS

Kosinov, Evaluation of N-grams conflation approach in text-based information retrieval, 2001, IEEE, 136-142.*
Tsatsanis et al., Object and texture classification using higher order statistics, Jul. 1992, IEEE, 733-750.*
SonicWall Content Filtering Service User's Guide, 2003, pp. 1-22.
SonicWall Content Filtering Service-Standard Administrator's Guide, 2003, pp. 1-24.

(Continued)

*Primary Examiner*—Jean B Fleurantin
(74) *Attorney, Agent, or Firm*—Blakely, Sokoloff, Taylor & Zafman LLP

(57) ABSTRACT

A training procedure for N-gram based statistical document classification has been disclosed. In one embodiment, a set of N-grams is selected out of a second set of N-grams, each of the N-grams having a sequence of N bytes, where N is an integer. Then a statistical content classification model is generated based on occurrences of the N-grams, if any, in a set of training documents and a set of validation documents. The statistical content classification model is provided to content filters to classify content.

28 Claims, 6 Drawing Sheets

OTHER PUBLICATIONS

SonicWall Content Filter List Administrator's Guide, 2001, pp. 1-20.

SonicWall Content Filtering Service-Premium Administrator's Guide, 2003, pp. 1-30.

Burke, "Content Security: The Business Value of Blocking Unwanted Content," White Paper, 2003 IDC, #3770, 12 pages.

"SurfControl Web Filter", accessed at: http://www.surfcontrol.com/products/web/ on Jun. 23, 2004, 2 pages.

"Protecting children online at school", Bess Internet Filtering Products, accessed at: http://www.n2h2.com/products/bess_home.php on Jun. 23, 2004, 1 page.

"How N2H2 Filtering Works", Bess Internet Filtering Products, accessed at: http://www.n2h2.com/products/bess.php?device=how_it_works on Jun. 23, 2004, 1 page.

"Available Features", Bess Internet Filtering Products, accessed at http://www.n2h2.com/products/bess.php?device=features on Jun. 23, 2004, 5 pages.

"Filtering Categories", Bess Internet Filtering Products, accessed at: http://www.n2h2.com/products/bess.php?device=categories on Jun. 23, 2004, 8 pages.

Websense, Inc., "Websense Enterprise", 2004, 4 pages.

"The Growing Risks of Internet Abuse", accessed at: http://www.websense.com/products on Jun. 24, 2004, 7 pages.

N-Gram, N-Gram—Wikipedia, the free encyclopedia, http://en.wikipedia.org/wiki/Ngram, Apr. 25, 2007, 5 Pages.

SurfControl Web Filtering Solutions, http://www.surfcontrol.com/Print.aspx?id=375&mid=4, Jun. 11, 2007, 6 Pages.

Aho et al., "Efficient String Matching: An Aid to Bibliographic Search", Assocation of Computing Machinery,Inc., 1975, 8 Pages.

* cited by examiner

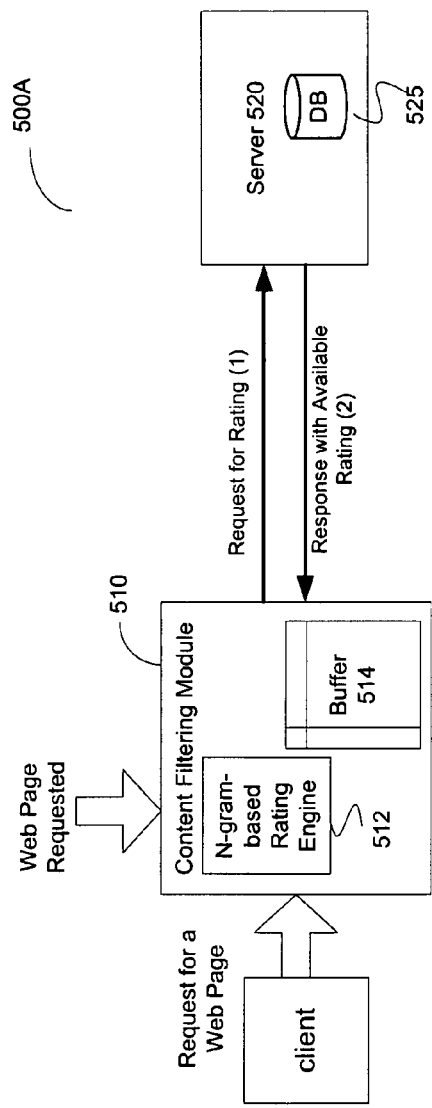
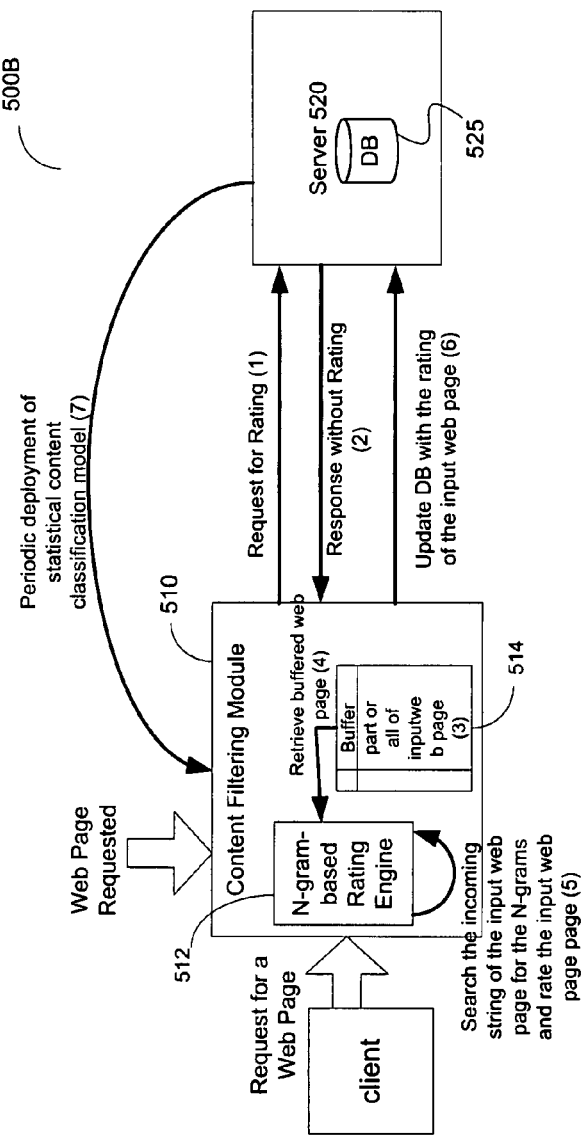
FIG. 5A
FIG. 5B

US 7,792,846 B1

TRAINING PROCEDURE FOR N-GRAM-BASED STATISTICAL CONTENT CLASSIFICATION

FIELD OF INVENTION

The present invention relates to content rating, and more particularly, to building an N-gram-based statistical model for content rating.

BACKGROUND

Today, various content filtering mechanisms are provided to entities to manage and/or control user access to the Internet via facilities provided by the entities. For example, a company typically implements some form of content filtering mechanism to control the use of the company's computers and/or servers to access contents (e.g., web pages and/or emails) from the Internet. Contents as used herein broadly refer to expressive work, which may include one or more of literary, graphics, audio, and video data. Access to content within certain predetermined categories using the company's computers and/or servers may not be allowed during some predetermined periods of time.

Conventionally, a content rating engine or a content classification engine may be installed in a firewall to screen contents coming into a system from an external network, such as email received and web pages retrieved from the Internet. The content rating engine may retrieve rating of the incoming contents from a rating database, if any, and/or attempt to rate the contents in real-time. To rate the content in real-time, the content rating engine may parse the contents to identify some predetermined keywords and/or tokens and then determine a rating for the contents based on the presence and/or absence of the keywords and/or tokens.

However, the above rating mechanism typically relies on delimiters between words in the contents in order to identify the keywords and/or tokens. Some major languages (e.g., Chinese, That, Japanese, etc.) do not have delimiters, such as spaces, between words, and thus, are referred to as non-delimited languages. Because of the lack of delimiters between words, segmenting a stream of text in such a language requires a preprocessing stage, which is language-specific and computationally intensive. For example, the following sentence may appear in a Chinese blog: 女儿的写作水平还算过得去. The correct split into words is: 女儿 (daughter), 的 (possessive particle), 写作 (writing), 水平 (level), 还 (still), 算 (consider), 过得去 (acceptable). With this split, the sentence means "The daughter's writing level is still considered acceptable." Note that some words are two-character long, some are one character long, and one is three-character long. Moreover, the whole context is necessary to split it correctly. For example, one could also have split it as follows: 女儿 (daughter), 的 (possessive particle), 写 (write), 作 (make), 水 (water), 平 (Ping, a person's name), 还 (still), 算 (consider), 过 (past tense particle), 得 (must), 去 (go). With this split, the sentence means "The daughter's write make water, Ping had already considered must go," which makes no sense. But for a computer system to detect automatically that this is nonsense, a word list is not sufficient. The computer system also needs a model of language usage. Developing and maintaining such a model is a knowledge-intensive task, and it would need to be repeated for each non-delimited language supported. Moreover, maintaining and using the model may be resource-intensive and may not be suitable for real-time applications. Thus, many conventional word-based real-time content rating mechanisms perform poorly on contents written in these non-delimited languages.

SUMMARY

The present invention includes a training procedure for N-gram based statistical content classification. In one embodiment, a set of N-grams is selected, each of the N-grams having a sequence of N bytes, where N is an integer. Then a statistical content classification model is generated based on occurrences of the N-grams, if any, in a set of training documents and a set of validation documents. The statistical content classification model is provided to content filters to classify content.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 5A and 5B illustrate a system usable with one embodiment of the invention.

DETAILED DESCRIPTION

A training procedure for N-gram based statistical content classification is described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
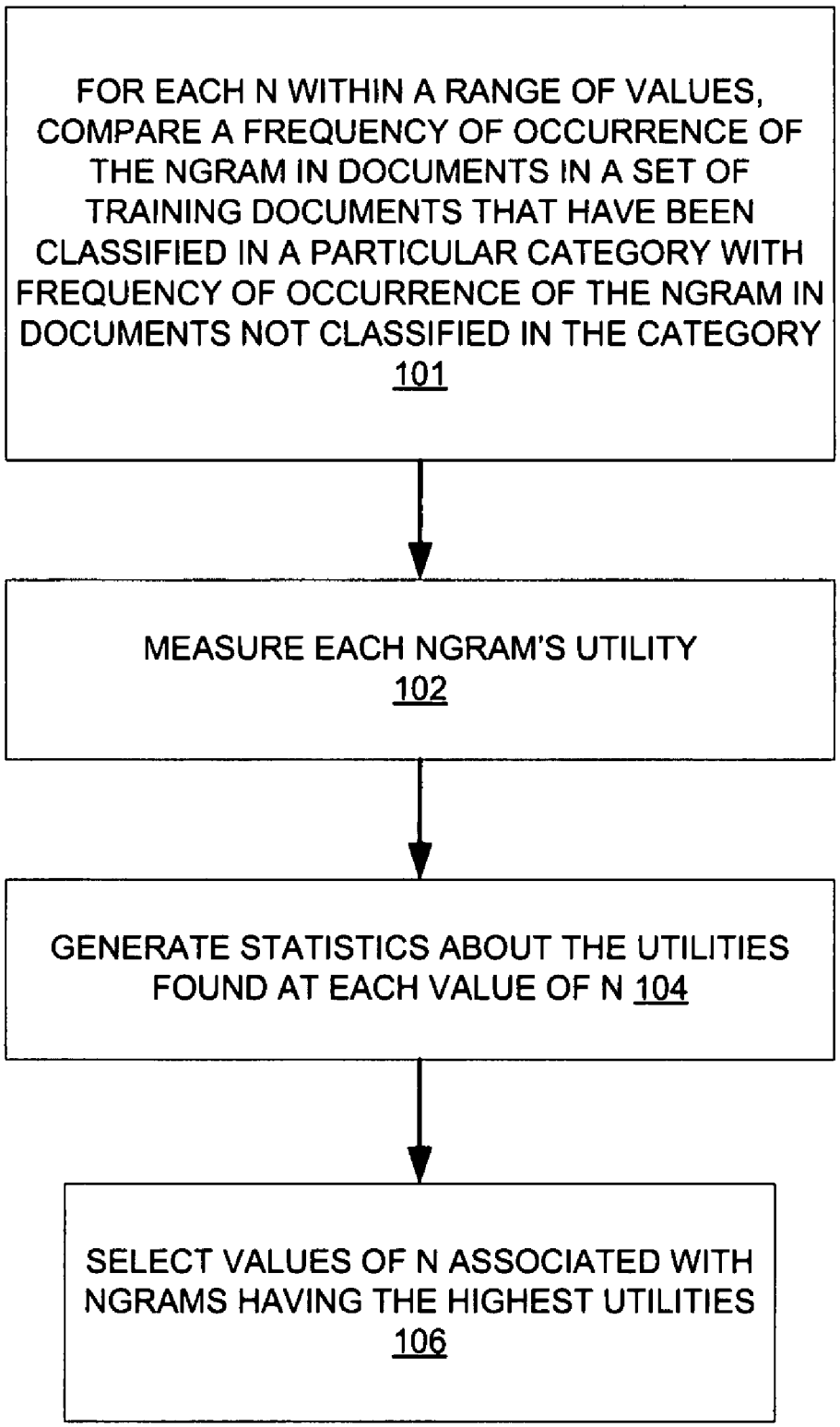
FIG. 1A illustrates a flow diagram of one embodiment of a process to select one or more values of N.

FIG. 1A illustrates a flow diagram of one embodiment of a process to select one or more values of N. The process is performed by processing logic that may comprise hardware (e.g., circuitry, dedicated logic, etc.), software (such as is run on a general-purpose computer system, a server, or a dedicated machine), firmware, or a combination of any of the above. Note that the basic tradeoff involved is that long N-grams generally tend to be more significant in content classification, but also tend to occur less frequently. To be useful for content classification, an N-gram needs to be both significant enough and frequent enough.

In order to select the values of N, for each N-gram of a set of N-grams for each N within a range of values, processing logic first compares a frequency of occurrence of the N-gram in documents in a set of training documents that have been classified in a particular category with a frequency of occurrence of the N-gram in documents not classified in the category (processing block 101). In some embodiments, the range of values is from one to a predetermined maximum value. The predetermined maximum value may be selected based on knowledge of a given language (e.g., Chinese, Japanese, etc.), such as the longest N-grams found in a dictionary for the given language.

In some embodiments, a category-wise significance function is defined as sig(N-gram, Category):=abs(log(frequency of N-gram occurring in document not in Category)/(frequency of N-gram occurring in document in Category), where abs denotes absolute value, and log denotes natural logarithm. To avoid division by zero or logarithm of zero, processing logic may add one to all N-gram occurrence counts. Further, the category-independent significance may be defined as the maximum, taken over all categories, of the category-wise significance: sig(N-gram):=max(sig(N-gram, Category)).

Processing logic further measures each N-gram's utility (processing block 102). In some embodiments, processing logic measures an N-gram's utility by combining the N-gram's significance with the N-gram's frequency. The utility function may be defined as the N-gram's frequency in the training set multiplied by the significance, i.e., utility(N-gram):=frequency(N-gram)*sig(N-gram).

Note that the best values of N may include those associated the most N-grams with the highest utility. Thus, processing logic generates statistics about the utilities found at each value of N (processing block 104). For example, processing logic may compute a sum of utility of all N-grams of size N for each N within the range. Based on the statistics, processing logic may select the values of N with the highest utilities (processing block 106).

Figure 1B:
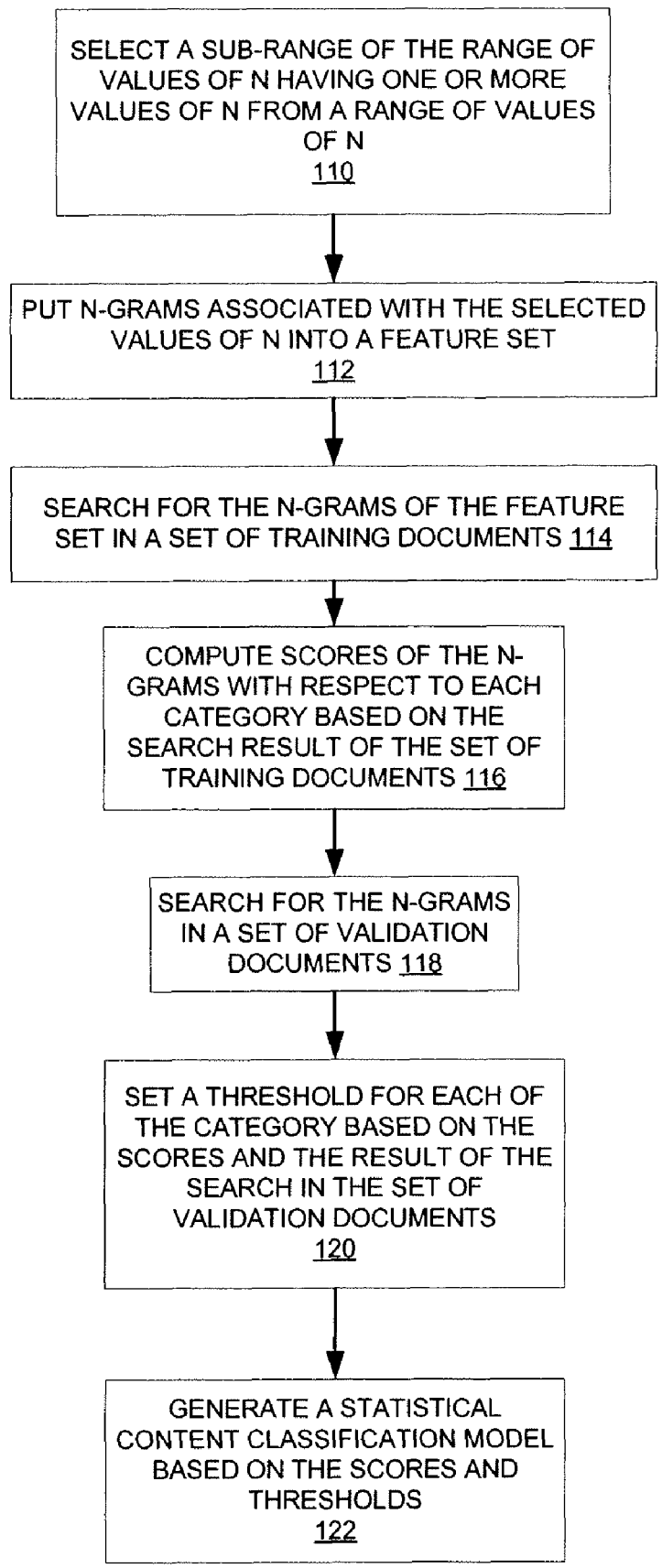
FIG. 1B illustrates a flow diagram of one embodiment of a process to generate a statistical content classification model.

FIG. 1B shows a flow diagram of one embodiment of a process to generate a statistical content classification model. The process is performed by processing logic that may comprise hardware (e.g., circuitry, dedicated logic, etc.), software (such as is run on a general-purpose computer system, a server, or a dedicated machine), firmware, or a combination of any of the above.

Referring to FIG. 1B, processing logic selects a sub-range of the range of values of N having one or more values of N, which is an integer (e.g., 1, 2, 3, etc.), from a range of values of N (processing block 110). Then processing logic puts N-grams associated with the selected values of N into a feature set (processing block 112). Details of some embodiments of selecting values of N have been discussed above with reference to FIG. 1A.

In some embodiments, processing logic searches for the N-grams of the feature set in a set of training documents (processing block 114). The set of training documents may include emails, web pages, and/or downloadable files that have been previously classified. For instance, some people may have already classified the training set of documents manually into a set of categories (e.g., pornographic content, violent content, gambling content, online chat room related content, etc.). Note that this technique is particularly useful for non-delimited languages because the search for N-grams does not rely on delimiters. As processing logic searches for the N-grams in the set of training documents, processing logic may keep track of the number of occurrences of each N-gram in training documents classified into each category. After searching through the training documents, processing logic computes scores of the N-grams with respect to each category based on the result of the search in the training documents (processing block 116). One exemplary embodiment of score computation is discussed in details below.

In some embodiments, processing logic has selected a set of N-grams for N within a predetermined range. Processing logic searches for each N-gram in the set of N-grams for each N within the predetermined range in the set of training documents. For each N-gram occurring in a training document and each category of which the training document is a member, processing logic increments a corresponding count or entry in a feature occurrence table. As such, processing logic tallies up the occurrences of each N-grams in the training documents with respect to each category. For each N-gram and for each category, processing logic computes a probability of a respective N-gram occurring in the training documents in a respective category and a probability of the respective N-gram not occurring in the training documents in the respective category. The processing logic may assign a score for the respective N-gram with respect to the respective category to be −log(probability in category/probability not in category).

Referring to FIG. 1B, processing logic then searches for the N-grams in a set of validation documents (processing block 118). Like the training documents, the set of validation documents may include web pages and/or downloadable files having content previously classified. For instance, some people may have already classified the validation set of documents manually into a set of categories (e.g., pornographic content, violent content, gambling content, online chat room related content, etc.). Then processing logic sets a threshold for each of the category based on the scores of the N-grams and the result of the search in the set of validation documents (processing block 120). One exemplary embodiment of threshold computation is discussed in details below.

In some embodiments, for each validation document and each category, processing logic determines the frequency of each N-gram found in the validation document appearing in a category and the frequency of this N-gram not appearing in the category. Then processing logic computes a result associated with the validation document and the category (c) as −log(frequency in c/frequency not in c)+Σ score (f, c) for all N-grams f found in the validation document. Processing logic holds the results computed in a result table. Then for each category c, processing logic sorts the set of values in the result table associated with the validation document and the category c from the lowest to the highest. For each value v in the set of values, processing logic determines the false positive rate (i.e., the number of entries in the result table with document not in the category c and with a result greater than or equal to v). If the false positive rate is greater than a predetermined desired false positive limit, then the threshold of the category c is set to be the previous value of v and then processing logic skips to the next category.

Finally, processing logic generates a statistical content classification model based on the scores and the thresholds determined above (processing block 122). The statistical content classification model may be stored in a repository accessible by content filters. Alternatively, the statistical content classification model may be transferred to content filters. Using the statistical content classification model, content filters may rate documents (e.g., web pages, emails, etc.) based on N-grams present and/or N-grams absent in the documents. More details of some embodiments of content rating using the statistical content classification model are discussed below.

Figure 2:
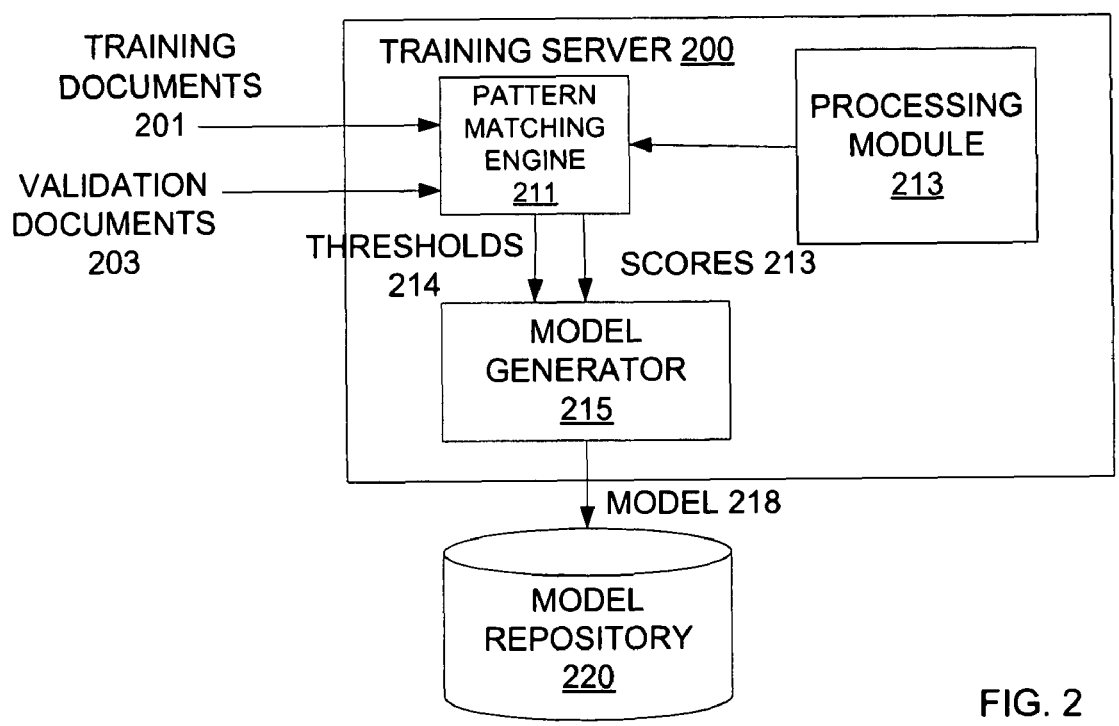
FIG. 2 illustrates one embodiment of a training server.

FIG. 2 illustrates one embodiment of a training server. The training server 200 includes a pattern matching engine 211, a processing module 213, and a model generator 215. The server 200 is coupled to a model repository 220.

In some embodiments, the processing module 213 determines a value or a range of values of N and selects a set of N-grams for each value of N based on criteria as discussed above. Then the pattern matching engine 211 receives a set of training documents 201 and searches for the N-grams in the training documents 201. The pattern matching engine 211 generates a set of scores 213 for each of the N-grams with respect to each of a set of categories based on the occurrence of the N-grams in the training documents 201. The scores 213 are provided to the model generator 215. Furthermore, the pattern matching engine 211 receives a set of validation documents 203 and searches for the N-grams in the validation documents 203. Based on the pre-classification of the validation documents 203, the occurrence of the N-grams in the validation documents 203, and the scores 213, the pattern matching engine 211 computes a set of results and then sets a threshold for each category based on the results and a predetermined false positive limit. The pattern matching engine 211 then sends the set of thresholds 214 set to the model generator 215.

The model generator 215 generates a statistical content classification model 218 based on the scores 213 and the thresholds 214. The model 218 may include a set of weights for each N-gram, where each weight is associated with a distinct one of the categories. Then the model 218 is stored in the model repository 220. Content filters may access the model 218 in the model repository 220 and use the model 218 to rate content of documents (e.g., web pages, emails, etc.). Alternatively, the training server 200 may transfer the model 218 to content filters, which stores the model 218 locally at the content filters for rating content of documents.

Figure 3:
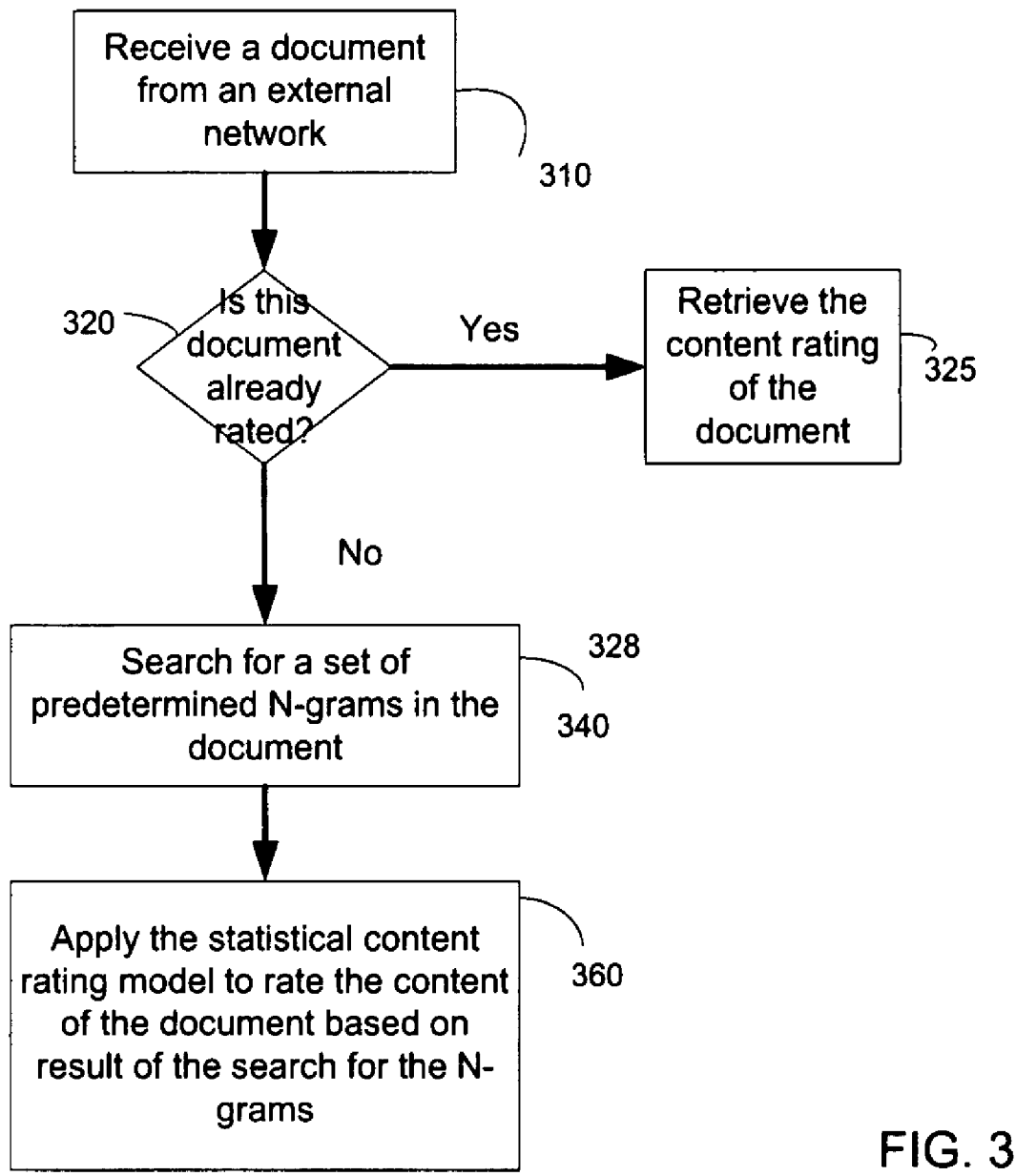
FIG. 3 illustrates a flow diagram of one embodiment of a process to perform N-gram-based content rating on a web page.

FIG. 3 illustrates a flow diagram for rating a document (e.g., a web page, an email, etc.) using N-gram-based rating according to one embodiment of the invention. The process is performed by processing logic that may comprise hardware (e.g., circuitry, dedicated logic, etc.), software (such as is run on a general-purpose computer system or a dedicated machine), firmware, or a combination of any of the above.

Referring to FIG. 3, processing logic receives a document from an external network (e.g., a web page, an email, etc.) (processing block 310). Then processing logic determines whether the document has already been rated (processing block 320). If the document has already been rated, then processing logic retrieves the content rating of the document, locally or remotely, from a storage device, such as a cache or a database, over a network (processing block 325).

If the web page has not been rated yet, then processing logic searches the document for a set of predetermined N-grams (processing block 340). Then processing logic uses the statistical content classification model to rate the content of the document based on the result of the search for the N-grams (processing block 360). In some embodiments, the statistical content classification model includes a set of weights for each N-gram, where each weight is associated with a distinct one of the categories. Processing logic generates a score for the document for each category based on a product of the number of occurrences of the N-grams by the corresponding weights. If the score of the document with respect to a category is higher than a threshold of the category, processing logic classifies the document to be in the category. Otherwise, processing logic does not classify the document to be in the category. Based on the classification of the document, processing logic may take different courses of actions, such as passing the document, blocking the document, warning a user of the document, etc. For example, if the document is an email and is classified to be in a category of spam, then processing logic may block the email and/or flag it to the email recipient. Alternatively, if the document is a web page and is classified to be in a prohibited category (e.g., pornographic material, violent material, etc.), then processing logic may block the web page.

The techniques discussed above may be implemented in various embodiments of a networked system. Some exemplary embodiments are discussed below to illustrate the concept. However, one should appreciate that the invention is not limited to the configurations in the following embodiments. For example, the N-gram-based rating engine may run on a dedicated machine or on different devices within the system, such as the content filtering module, the server, etc. Furthermore, the N-gram-based rating engine may rate documents in real time and/or at the back end. Moreover, the handling of documents that have to be rated may vary from system to system. Likewise, the timing for when to access a server and when to access a N-gram-based rating engine may vary from system to system.

Figure 4:
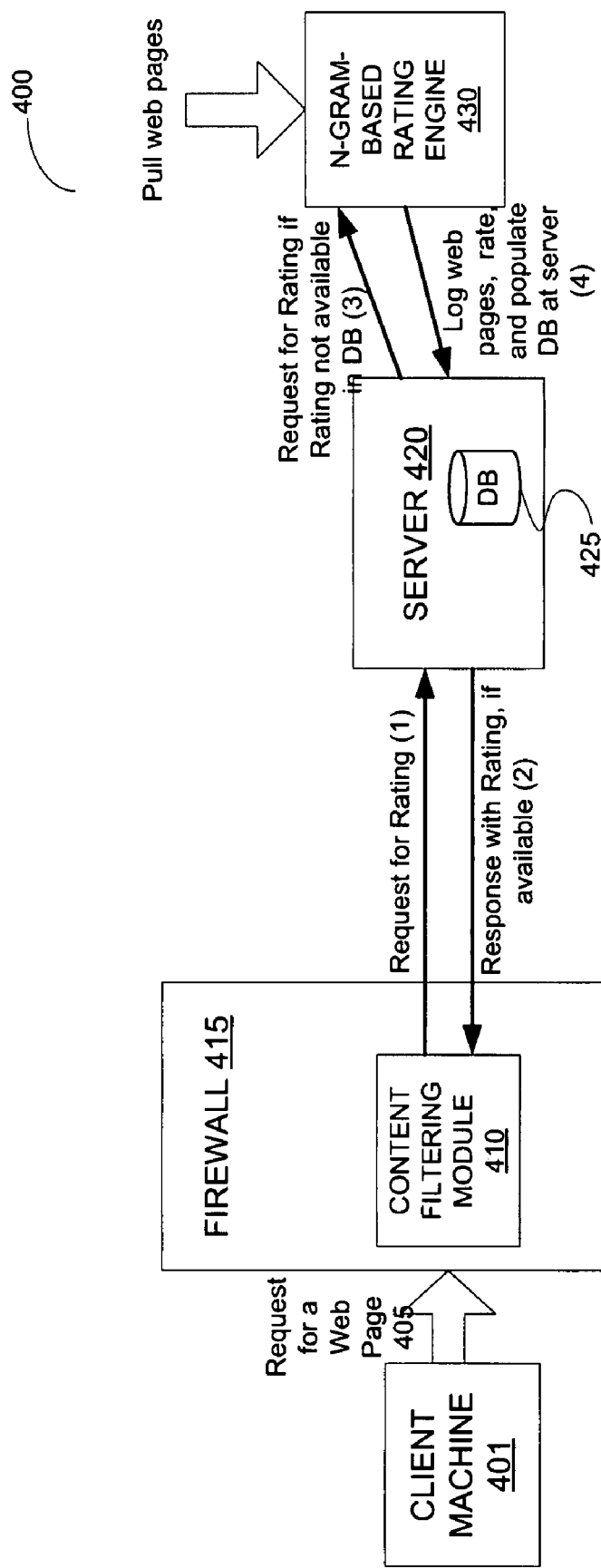
FIG. 4 illustrates a system usable with one embodiment of the invention.

FIG. 4 illustrates one embodiment of a system usable with the invention. The system 400 includes a client machine 401, a content filtering module 410, a firewall 415, a server 420, a database 425, and a N-gram-based rating engine 430. The content filtering module 410 is executable on the firewall 415, which may be implemented on a proxy server, a personal computer, a workstation, etc. Alternatively, the content filtering module 410 may be executable on the client machine 401, in which case, the firewall 415 could be eliminated. Referring back to FIG. 4, the content filtering module 410 is communicably coupled to the server 420. The server 420 is also communicably coupled to the N-gram-based rating engine 430. Alternatively, the N-gram-based rating engine 430 may be executable on the server 420. Referring back to FIG. 4, the database 425 has stored therein the ratings of web pages already rated. The database 425 may be within the server 420 as shown in FIG. 4. Alternatively, the database 425 may be a separate unit communicably coupled to the server 420.

Note that any or all of the components and the associated hardware illustrated in FIG. 4 may be used in various embodiments of the system 400. However, it should be appreciated that other configurations of the system 400 may include more or less devices than those shown in FIG. 4.

The N-gram-based rating engine 430 searches for a predetermined set of N-grams in documents and uses a statistical content classification model generated as described above to rate the documents. One exemplary flow of operations in the system 400 is described in detail below to illustrate the concept.

In one embodiment, the content filtering module 410 sends a request for rating (1) to the server 420 when the content filtering module 410 receives a document. For example, the document may be an email or a web page from a web page host. In response to the request (1), the server 420 checks the database 425 for the rating. If the rating is available in the database 425, the server 420 retrieves the rating from the database 425 and sends the rating to the content filtering module 410 with a response (2). Otherwise, the server 420 may send a response (2) without rating to the content filtering module 410 and may send a request (3) for the rating to the N-gram-based rating engine 430. In one embodiment, the N-gram-based rating engine 430 performs N-gram-based rating on the document received as described above with reference to FIG. 3. After rating the document, the N-gram-based rating engine 430 may return the rating (4) to the server 420 to log the corresponding document, the rating, and to populate the database 425 with the rating. Therefore, next time the server 420 receives a request for the rating of the same document, the server 420 would have the rating available in the database 425.

If the content filtering module 410 receives the response (2) without the rating, the content filtering module 410 may take a variety of actions. For example, it may pass the document. When the same document is received again, the database 425 would have the rating available because the document would have been rated by then as discussed above. As another example, the content filtering module 410 may block the document, thereby requiring the user to request it until a rating is available.

Alternatively, the server 420 may request the N-gram-based rating engine 430 to rate the document in real time. The server 420 may wait until the N-gram-based rating engine 430 completes rating the document and sends the rating to the server 420 before the server 420 sends the response (2) with the rating to the content filtering module 410. In such a system, the content filtering module 410 may be implemented to wait for a predetermined period for a response from the server 420. If the predetermined period expires and the server 420 has not sent a response with the rating to the content filtering module 410 yet, the content filtering module 410 may take a variety of actions (e.g., pass the document, block the document, etc.).

FIGS. 5A and 5B illustrate an alternate embodiment of a system usable with the invention. The system 500 includes a content filtering module 510, a database 525, and a server 520. The content filtering module 510 is communicably coupled to the server 520. In one embodiment, the content filtering module 510 includes a N-gram-based rating engine 512 and a buffer 514. The database 525 may be within the server 520 as shown in FIGS. 5A and 5B. Alternatively, the database 525 may be a separate unit communicably coupled to the server 520.

Note that any or all of the components and the associated hardware illustrated in FIGS. 5A and 5B may be used in various embodiments of the system 500. However, it should be appreciated that other configurations of the system 500 may include more or less devices than those shown in FIGS. 5A and 5B.

Various embodiments may populate the database 525 differently (e.g., N-gram-based rating, token-based rating, manually, keywords, combinations thereof, etc.). Also, various embodiments may provide the initial training set and statistics to the N-gram-based rating engine 512 differently (e.g., from the server 520, from a separate server, preinstalled, etc.) and may optionally provide updates (7) (e.g., from server 520, from a separate server, etc.).

When the content filtering module 510 receives a document, the content filtering module 510 sends a request (1) for the rating of the document to the server 520. In response to the request (1), the server 520 checks the database 525 for the rating. If the rating is available in the database 525, the server 520 retrieves the rating and sends the rating with a response (2) to the content filtering module 510 as shown in FIG. 5A.

In some embodiments, the content filtering module 510 may hold the document until the rating arrives and then determine whether to pass the document held based on the rating. In some embodiments, if the rating does not arrive within a predetermined period, the content filtering module 510 take a variety of actions (e.g., pass the document, block the document, etc.).

Referring to FIG. 5B, if the rating is not available in the database 520, the server 520 may return a response (2) to the content filtering module 510 without the rating. When the content filtering module 510 receives the response (2) without the rating, the content filtering module 510 uses the N-gram-based rating engine 512 to rate the document. As described above, the content filtering client 510 may have pulled the document substantially simultaneously with sending the request (1) for the rating. All or part of the document pulled may be stored in the buffer 514 temporarily (3). In one embodiment, the N-gram-based rating engine 512 retrieves a string representing the stored document from the buffer 514 (4) and searches for a set of predetermined N-grams in the string (5). As discussed above, the N-gram-based rating engine 512 may periodically receive an updated statistical content classification model (7) from the server 520. The N-gram-based rating engine 512 may rate the document using the statistical content classification model based on presence and/or absence of the predetermined N-grams in the document.

In some embodiments, the N-gram-based rating engine 512 rates the document in real time and the content filtering module 510 holds the document until the rating is available and the content filtering module 510 can determine whether the document can be passed. Alternatively, if the N-gram-based rating engine 512 does not complete rating the document within a predetermined period, the content filtering module 510 may go ahead to pass the document in order to keep the document retrieval latency below a predetermined limit.

When the server lacks a rating for a document, the rating to be stored in the server (which may differ from the real time rating that could be produced by the N-gram-based engine 512), may be obtained in a variety of ways. For example, it may be obtained as described with reference to FIG. 4. Alternatively, it may be logged and obtained manually. As another alternative, it may be obtained from the N-gram-based rating engine 512. Specifically, once the N-gram-based rating engine 512 determines the rating of the document, the content filtering module 510 sends the rating to the server 520 to update the database 525 with the rating (6). Hence, the next time a request for the same document is received, the content filtering module 510 or others can receive the rating from the database 525 without rating the document again. In some embodiments, the rating may be stored with a predetermined time-to-live (TTL) parameter in the database 525 such that documents that have been rated before a predetermined period have to be rated again because the content of some documents may change over time, and thus, the old rating may have become obsolete.

In one embodiment, the content filtering module (e.g., 410 and/or 510 in FIGS. 4, 5A, and 5B, respectively) may include a cache (a local storage device that may include any of various types of machine readable media, such as, for example, random access memory (RAM), dynamic random access memory (DRAM), flash memory, etc.). Recent ratings are stored in the cache (e.g., from the server, from the on-board N-gram-based rating engine, etc.). In some embodiments, the content filtering module may check the cache to see if the rating of the document is available in the cache while the document is being pulled. If the rating is available in the cache, then the content filtering module may use the rating from the cache to determine whether to pass the document.

Furthermore, in some embodiments, the rating may be stored with a predetermined TTL parameter such that documents that have been rated before a predetermined period have to be rated again to ensure the rating is current.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium or a machine-accessible medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer-implemented method, comprising:
    selecting a plurality of N-grams from a second plurality of N-grams, wherein the second plurality of N-grams are associated with a range of values of N and the plurality of N-grams are associated with a sub-range of the range of values of N, wherein each of the second plurality of N-grams comprises a sequence of N bytes, where N is an integer;
    generating a statistical content classification model based on occurrences of the plurality of N-grams, if any, in a set of training documents and a set of validation documents;
    providing the statistical content classification model to content filters to classify content into one or more of a plurality of categories;
    searching for the plurality of N-grams in the set of training documents;
    computing a plurality of scores for each of the plurality of N-grams with respect to the plurality of categories;
    searching for the plurality of N-grams in the set of validation documents; and
    determining a threshold for each of the plurality of categories.

2. The method of claim 1, wherein determining the threshold for each of the plurality of categories comprises:
    computing the threshold using a frequency of occurrence of each of the plurality of N-grams in a subset of validation documents of the set of validation documents that have been classified into a respective category, a frequency of non-occurrence of each of the plurality of N-grams in the subset of validation documents, the plurality of scores, and a predetermined false positive limit.

3. The method of claim 1, wherein each of said plurality of N-grams representing at least a portion of a keyword in a non-delimited natural language.

4. The method of claim 3, wherein the non-delimited natural language is Chinese.

5. The method of claim 1, wherein the set of training documents includes one or more web pages.

6. The method of claim 1, wherein the set of training documents includes one or more electronic mail messages.

7. A computer-implemented method, comprising:
    selecting a plurality of N-grams from a second plurality of N-grams, wherein the second plurality of N-grams are associated with a range of values of N and the plurality of N-grams are associated with a sub-range of the range of values of N, wherein each of the second plurality of N-grams comprises a sequence of N bytes, where N is an integer;
    generating a statistical content classification model based on occurrences of the plurality of N-grams, if any, in a set of training documents and a set of validation documents;
    providing the statistical content classification model to content filters to classify content into one or more of a plurality of categories;
    determining a utility for each of the second plurality of N-grams using a frequency of occurrence of a respective N-gram in a subset of training documents of the set of training documents that have been classified in a respective category and a frequency of occurrence of the respective N-gram in remaining training documents of the set of training documents; and
    selecting the sub-range of values of N based on utilities of the second plurality of N-grams.

8. The method of claim 7, wherein each of said plurality of N-grams representing at least a portion of a keyword in a non-delimited natural language.

9. The method of claim 8, wherein the non-delimited natural language is Chinese.

10. The method of claim 7, wherein the set of training documents includes one or more web pages.

11. The method of claim 7, wherein the set of training documents includes one or more electronic mail messages.

12. A machine-accessible medium that provides instructions that, if executed by a processor, will cause the processor to perform operations comprising:
  selecting a plurality of N-grams from a second plurality of N-grams, wherein the second plurality of N-grams are associated with a range of values of N and the plurality of N-grams are associated with a sub-range of the range of values of N, wherein each of the second plurality of N-grams comprises a sequence of N bytes, where N is an integer;
  generating a statistical content classification model based on occurrences of the plurality of N-grams, if any, in a set of training documents and a set of validation documents;
  providing the statistical content classification model to content filters to classify content into one or more of a plurality of categories;
  searching for the plurality of N-grams in the set of training documents;
  computing a plurality of scores for each of the plurality of N-grams with respect to the plurality of categories;
  searching for the plurality of N-grams in the set of validation documents; and
  determining a threshold for each of the plurality of categories.

13. The machine-accessible medium of claim 12, wherein determining the threshold for each of the plurality of categories comprises:
  computing the threshold using a frequency of occurrence of each of the plurality of N-grams in a subset of validation documents of the set of validation documents that have been classified into a respective category, a frequency of non-occurrence of each of the plurality of N-grams in the subset of validation documents, the plurality of scores, and a predetermined false positive limit.

14. The machine-accessible medium of claim 12, wherein each of said plurality of N-grams representing at least a portion of a keyword in a non-delimited natural language.

15. The machine-accessible medium of claim 14, wherein the non-delimited natural language is Chinese.

16. The machine-accessible medium of claim 12, wherein the set of training documents includes one or more web pages.

17. The machine-accessible medium of claim 12, wherein the set of training documents includes one or more electronic mail messages.

18. A machine-accessible medium that provides instructions that, if executed by a processor, will cause the processor to perform operations comprising:
  selecting a plurality of N-grams from a second plurality of N-grams, wherein the second plurality of N-grams are associated with a range of values of N and the plurality of N-grams are associated with a sub-range of the range of values of N, wherein each of the second plurality of N-grams comprises a sequence of N bytes, where N is an integer;
  generating a statistical content classification model based on occurrences of the plurality of N-grams, if any, in a set of training documents and a set of validation documents;
  providing the statistical content classification model to content filters to classify content into one or more of a plurality of categories;
  determining a utility for each of the second plurality of N-grams using a frequency of occurrence of a respective N-gram in a subset of training documents of the set of training documents that have been classified in a respective category and a frequency of occurrence of the respective N-gram in remaining training documents of the set of training documents; and
  selecting the sub-range of values of N based on utilities of the second plurality of N-grams.

19. The machine-accessible medium of claim 18, wherein each of said plurality of N-grams representing at least a portion of a keyword in a non-delimited natural language.

20. The machine-accessible medium of claim 19, wherein the non-delimited natural language is Chinese.

21. The machine-accessible medium of claim 18, wherein the set of training documents includes one or more web pages.

22. The machine-accessible medium of claim 18, wherein the set of training documents includes one or more electronic mail messages.

23. An apparatus comprising:
  a pattern matching engine to search for a plurality of N-grams in a set of training documents and a set of validation documents, each of said plurality of N-grams representing at least a portion of a keyword in a natural language, and the set of training documents and the set of validation documents being written in the natural language, wherein each of said plurality of N-grams comprises a sequence of N bytes, where N is an integer; and
  a model generator coupled to the search engine to generate a statistical content classification model based on occurrences of each of the plurality of N-grams in the set of training documents and the set of validation documents, wherein the search engine is operable to compute a plurality of scores for each of the plurality of N-grams with respect to a plurality of categories;
  wherein the model generator is operable to determine a plurality of thresholds for the plurality of categories using the plurality of scores and the set of validation documents, each of the plurality of thresholds being associated with a distinct one of the plurality of categories; wherein the model generator is operable to compute each of the plurality of thresholds using a frequency of occurrences of each of the plurality of N-grams in the set of validation documents, the plurality of scores, and a predetermined false positive limit.

24. The apparatus of claim 23, further comprising:
  a processing module to select the plurality of N-grams from a second plurality of N-grams based on utilities of the plurality of N-grams in content classification with respect to the set of training documents.

25. The apparatus of claim 23, wherein the model generator is operable to determine a plurality of thresholds for the plurality of categories using the plurality of scores and the set of validation documents, each of the plurality of thresholds being associated with a distinct one of the plurality of categories.

26. The apparatus of claim 25, wherein the model generator is operable to compute each of the plurality of thresholds using a frequency of occurrences of each of the plurality of N-grams in the set of validation documents, the plurality of scores, and a predetermined false positive limit.

27. A system comprising:
  a pattern matching engine to search for a plurality of N-grams in a set of training documents and a set of validation documents, each of said plurality of N-grams representing at least a portion of a keyword in a natural language, and the set of training documents and the set of validation documents being written in the natural language, wherein each of said plurality of N-grams comprises a sequence of N bytes, where N is an integer;
  a model generator coupled to the search engine to generate a statistical content classification model based on occurrences of each of the plurality of N-grams in the set of training documents and the set of validation documents;

a repository coupled to the model generator to store the statistical content classification model;

an N-gram-based content rating engine coupled to the repository, to access the statistical content classification model and to rate content of documents in the natural language using the statistical content classification model, wherein the documents are from a network external to the system;

a content filtering module comprising the N-gram-based content rating engine; and a client machine coupled to the content filtering module, wherein the content filtering module receives a request to access a web page from the client machine and the N-gram-based content rating engine rates content of the requested web page, wherein the content filtering module blocks the requested web page from the client machine if the content of the requested web page is in a prohibited category and the content filtering module passes the requested web page to the client machine if the content of the requested web page is in an allowable category.

28. A system comprising:

a pattern matching engine to search for a plurality of N-grams in a set of training documents and a set of validation documents, each of said plurality of N-grams representing at least a portion of a keyword in a natural language, and the set of training documents and the set of validation documents being written in the natural language, wherein each of said plurality of N-grams comprises a sequence of N bytes, where N is an integer;

a model generator coupled to the search engine to generate a statistical content classification model based on occurrences of each of the plurality of N-grams in the set of training documents and the set of validation documents;

a repository coupled to the model generator to store the statistical content classification model;

an N-gram-based content rating engine coupled to the repository, to access the statistical content classification model and to rate content of documents in the natural language using the statistical content classification model, wherein the documents are from a network external to the system;

a content filtering module comprising the N-gram-based content rating engine; and a client machine coupled to the content filtering module, wherein the content filtering module receives an incoming electronic mail message and the N-gram-based content rating engine rates content of the electronic mail message, wherein the content filtering module blocks the electronic mail message from the client machine if the content of the electronic mail message is in a prohibited category and the content filtering module passes the electronic mail message to the client machine if the content of the electronic mail message is in an allowable category.

* * * * *